(12) United States Patent
Matsushiro

(10) Patent No.: US 6,459,817 B1
(45) Date of Patent: Oct. 1, 2002

(54) IMAGE-PROCESSING METHOD AND APPARATUS GENERATING PSEUDO-TONE PATTERNS WITH IMPROVED REGULARITY

(75) Inventor: Nobuhito Matsushiro, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/246,961

(22) Filed: Feb. 9, 1999

(30) Foreign Application Priority Data

Feb. 16, 1998 (JP) .......................................... 10-032881

(51) Int. Cl.[7] ................................................ H04N 1/40
(52) U.S. Cl. ...................................... 382/251; 382/270
(58) Field of Search ................................ 382/251–253, 382/237, 270, 275; 358/456–457

(56) References Cited

U.S. PATENT DOCUMENTS 5,268,772 A * 12/1993 Ikuta ........................... 358/456
5,425,112 A * 6/1995 Kerz ............................ 382/270

* cited by examiner

Primary Examiner—Thomas D. Lee
Assistant Examiner—Stephen Brinich
(74) Attorney, Agent, or Firm—Akin, Gump, Strauss, Hauer & Feld, L.L.P.

(57) ABSTRACT

When image data are processed to generate pseudo-tone patterns, a predetermined threshold is modified according to at least two periodic functions with different spatial periods. The picture elements are compared with the modified threshold, and the comparison results are used to generate an output image. The periodic threshold modifications cause dots to appear preferentially in regular patterns, thereby reducing dot noise, and providing improved control over the overlaying of dot patterns in different color planes in a color image.

28 Claims, 16 Drawing Sheets

IMAGE-PROCESSING METHOD AND APPARATUS GENERATING PSEUDO-TONE PATTERNS WITH IMPROVED REGULARITY

BACKGROUND OF THE INVENTION

The present invention relates to a method and apparatus for processing a gray-scale image or a color image to generate pseudo-tone patterns with improved regularity.

Pseudo-tone pattern generation is method of representing input gray levels or colors that cannot be directly expressed by an output device. Pseudo-tone pattern generation is basically a type of quantization process, and is carried out by comparing the image data with one or more threshold values. Loss of colors or gray levels can be avoided by diffusing the quantization error of each picture element or pixel to some of the neighboring pixels. A more detailed description of this error-diffusion process will be given later. For a gray-scale image, the result of error diffusion is that an intermediate gray level is simulated by a pseudo-tone pattern of dots quantized to levels above and below the intermediate level. The general term for this type of simulated gray-level expression is dithering. Dithering can also be performed directly, by replacing a single threshold with a matrix of differing thresholds.

A typical use of error diffusion and dithering is to enable a printer that can print only black and white dots to express gray levels as patterns with appropriate densities of black dots. A problem is that the dot patterns tend to exhibit random clumping and other random effects, generally referred to as dot noise, that do not look well when printed. In many cases, a more regular dot pattern is desirable. For example, a pseudo-tone pattern expressing a fifty-percent gray level is preferably a checkerboard pattern of black and white dots, rather than a random pattern.

Error diffusion and dithering are also employed in color printing. Here a further problem is that the random placement of the dots frustrates control over the way in which different color planes are overlaid.

SUMMARY OF THE INVENTION

It is accordingly an object of the present invention to increase the regularity of the pseudo-tone patterns in a quantized image.

Another object of the invention is to provide control over the relative positions of dot patterns in different color planes in a quantized color image.

The invented method of processing image data comprises the steps of:
  (a) modifying at least one predetermined threshold according to at least two periodic functions with different periods;
  (b) comparing the image data with the modified threshold; and
  (c) generating output image data from the comparison results, the output image data being limited to a certain number of pixel levels.

The invention also provides image-processing apparatus for carrying out steps (a), (b), and (c).

The periodic modifications of the threshold cause dots to appear preferentially in predetermined positions, which have a regular, periodic pattern. Dot noise is thereby reduced.

When a color image is processed, the alignment of the regular patterns in different color planes can be controlled so that the dot patterns are overlaid on one another in desirable ways when, for example, the output image is printed.

DETAILED DESCRIPTION OF THE INVENTION

Figure 1:
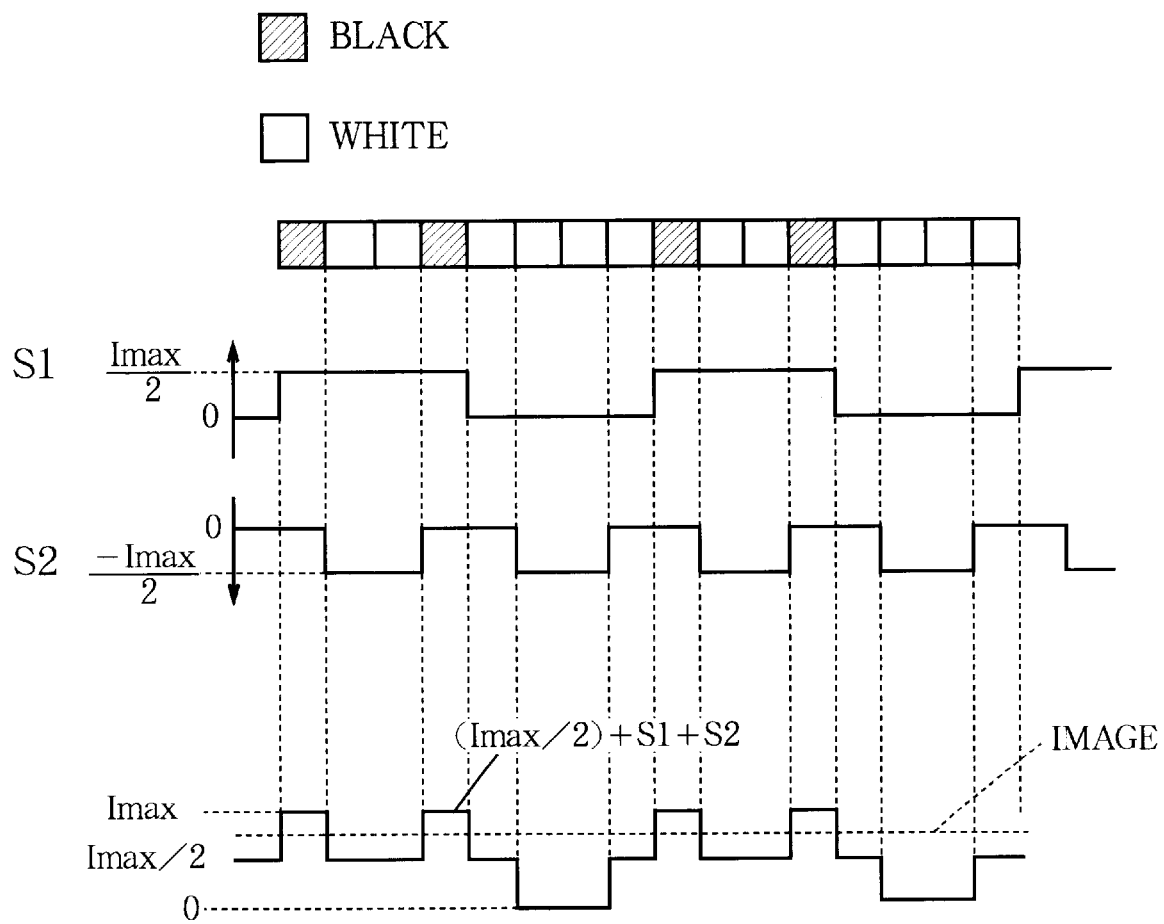
FIG. 1 shows a one-dimensional example of the modification of a threshold according to the present invention.
Figure 2A:
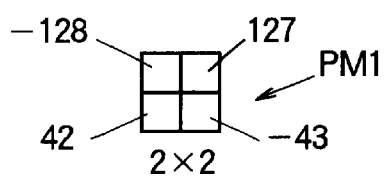
FIGS. 2A, 2B, 2C, and 2D show threshold pattern matrices employed in the embodiments of the invention.
Figure 2B:
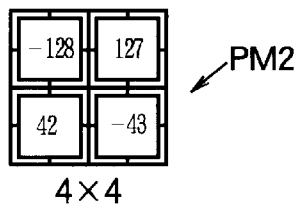
Figure 2C:
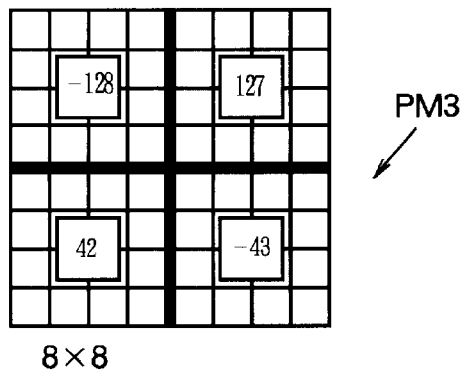
Figure 2D:
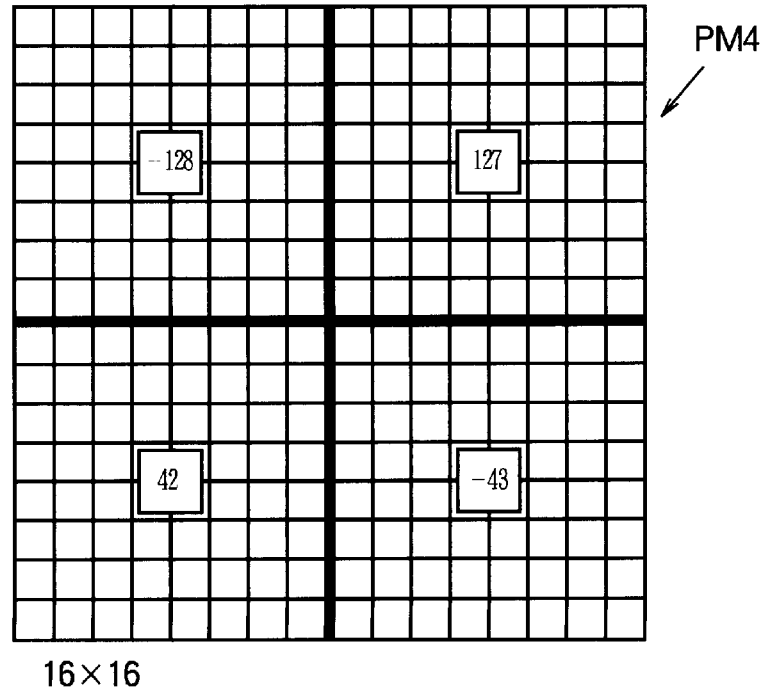

Embodiments of the invention will be described with reference to the attached drawings, in which like parts are indicated by like reference characters.

First, a simplified one-dimensional description of the modification of a threshold value by two periodic functions will be given. Consider a row of sixteen pixels in a gray-scale image having a uniform gray level equal to three-fourths ($12/16$) the maximum level, the maximum level ($I_{max}$) representing white. When the gray-scale image is converted to a bi-level image, four of these sixteen pixels should be made black, and the remaining twelve should be made white. The basic threshold level (Th) is half the maximum level ($I_{max}/2$). A first periodic function S1, which generates a periodic pattern, and a second periodic function S2, having the values illustrated in FIG. 1, are added to the basic threshold level to obtain a modified threshold ($I_{max}/2+S1+S2$) that varies as shown at the bottom of FIG. 1. The image data are compared with the modified threshold, producing the desired four black pixels, as shown at the top of FIG. 1.

Figure 3:
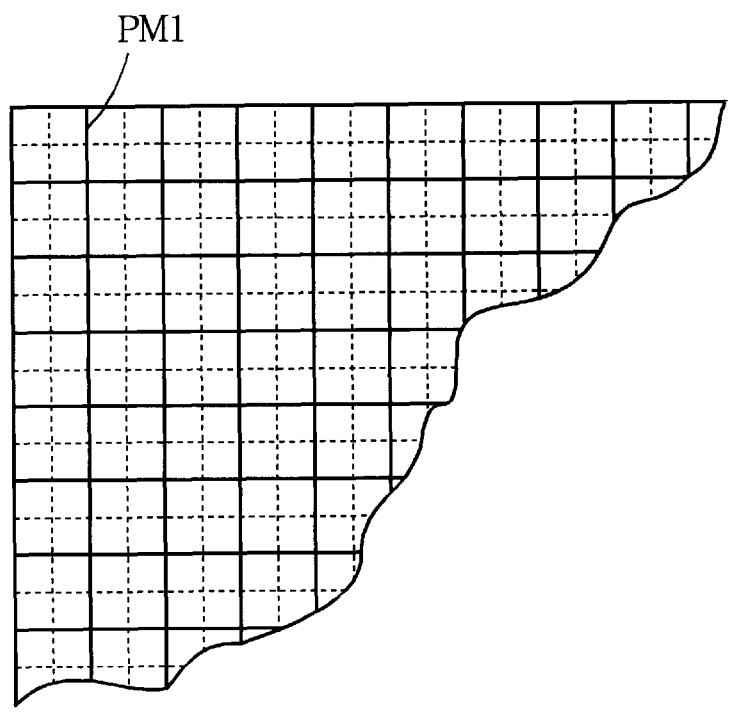
FIG. 3 illustrates a two-dimensional periodic function comprising repeated copies of the pattern matrix in FIG. 2A.
Figure 4:
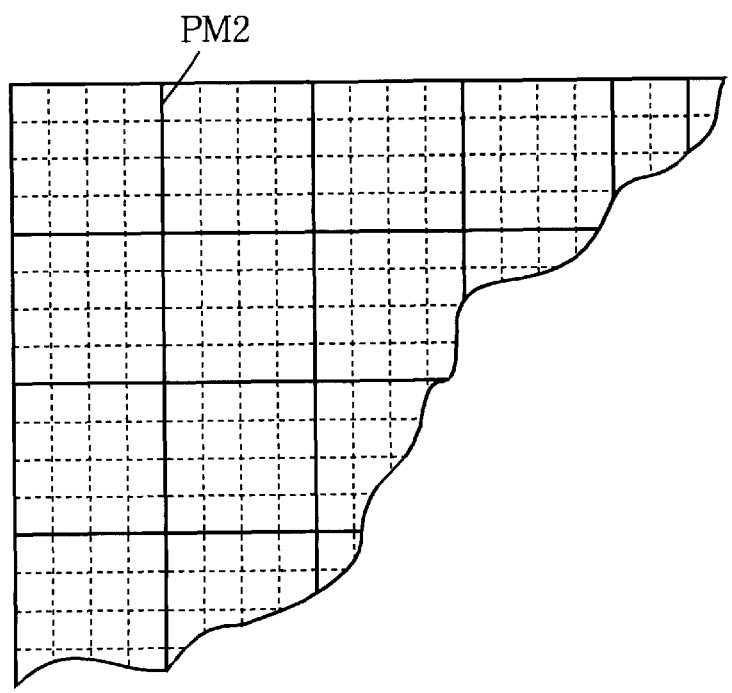
FIG. 4 illustrates a two-dimensional periodic function comprising repeated copies of the pattern matrix in FIG. 2B.

In two dimensions, a periodic function can be built up from repetitions of a threshold offset pattern matrix, referred to below simply as a pattern matrix. FIGS. 2A, 2B, 2C, and 2D show four examples of pattern matrices with different sizes. Each of these pattern matrices can be repeated to cover a two-dimensional image plane, producing four periodic functions with different repeating periods. FIG. 3 shows the plane covered by copies of the pattern matrix PM1 in FIG. 2A, the solid lines indicating the matrix boundaries and the dotted lines indicating cells within the matrices. The periodic function is obtained by placing the values shown in FIG. 2A in the cells. FIG. 4 shows the plane covered by copies of the pattern matrix PM2 in FIG. 2B, giving a similar periodic function.

Each pattern matrix is divided into four quadrants, and has a constant value within each quadrant. The periodic function formed from the two-by-two pattern matrix PM1 thus has the highest spatial frequency. The periodic function formed from the sixteen-by-sixteen pattern matrix PM4 has the lowest spatial frequency.

In the present invention, a desired periodic function is decomposed into several basic periodic functions in the same way as in a Fourier expansion. In the present example, the basic functions are PM1, PM2, PM3, and PM4. The basic functions are weighted and summed to build up the desired periodic function. The weighting coefficients depend on the input gray level.

Figures 5A, 5B, 5C:
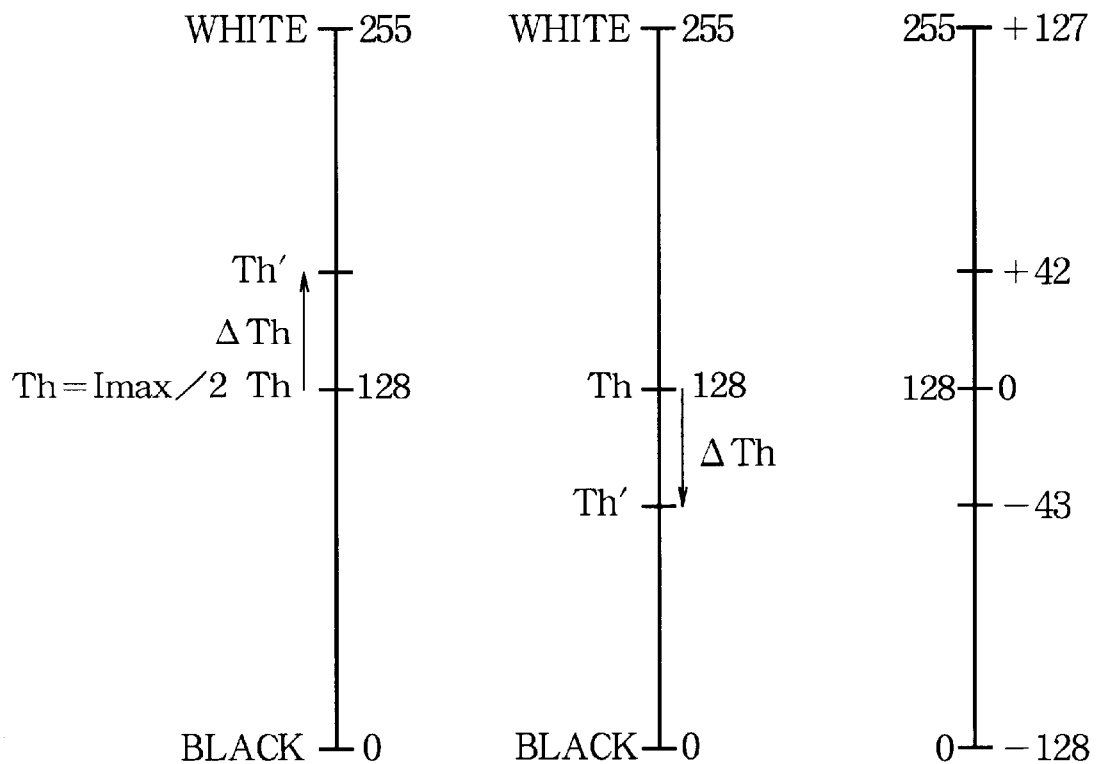
FIGS. 5A, 5B, and 5C illustrate threshold modifications.

It will be assumed in the first embodiment below that the gray scale varies from zero (black) to two hundred fifty-five (white), and that image data having this gray scale are to be converted to bi-level data. The basic conversion threshold is one hundred twenty-eight (128, approximately equal to 255/2). This basic threshold (Th) will be modified by adding a positive offset ΔTh as shown in FIG. 5A, or a negative offset ΔTh as shown in FIG. 5B, to obtain a modified threshold Th'. The image data will be compared with the modified threshold.

The modified threshold Th' is within the range from black to white if the offset ΔTh is within the range from minus one hundred twenty-eight to one hundred twenty-seven (−128 to 127). These two values are used in the two upper quadrants of each of the pattern matrices shown in FIGS. 2A, 2B, 2C, and 2D. Values substantially equal to one-third of these values are used in the bottom two quadrants; these values (42 and −43) divide the gray scale into three substantially equal portions, as indicated in FIG. 5C.

The four-by-four pattern matrix PM2, for example, has the value minus one hundred twenty-eight (−128) in all four cells in the upper left quadrant, the value one hundred twenty-seven (127) in all four cells in the upper right quadrant, the value forty-two (42) in all four cells of the lower left quadrant, and the value minus forty-three (−43) in all four cells of the lower right quadrant. The four quadrants of the other pattern matrices are likewise filled with these values.

Larger pattern matrices, such as thirty-two-by-thirty-two and sixty-four-by-sixty-four pattern matrices, can be similarly constructed and used for processing large images.

The reason for placing numbers with substantially equal absolute values in horizontally adjacent quadrants is to obtain an equal balance between positive and negative offsets in each horizontal scanning line, similar to the equal positive and negative intervals of the sine functions used in Fourier-series expansions. The reason for making the sum of the four quadrants substantially equal to zero is to avoid changing the overall darkness of the image. If the sum of the four quadrants were much less than zero, the image would be noticeably lightened; if the sum were much more than zero, the image would be darkened.

The invention is not limited to pattern matrices of the type shown in FIGS. 2A, 2B, 2C, and 2D. For example, without changing the algebraic signs of the values in the lower quadrants, these values (42, −43) can be replaced with the values (127, −128) used in the upper quadrants, so that an even positive-negative balance is also obtained in each vertical column.

The offset ΔTh is obtained separately for each pixel by multiplying the values of the four periodic functions at the pixel position by four weighting functions W1, W2, W3, W4, and adding the resulting products. The weighting functions are functions of the gray level of the pixel. Each weighting function has non-zero weight values following a sine curve in a certain range of gray levels, and is zero outside this range.

Figure 6:
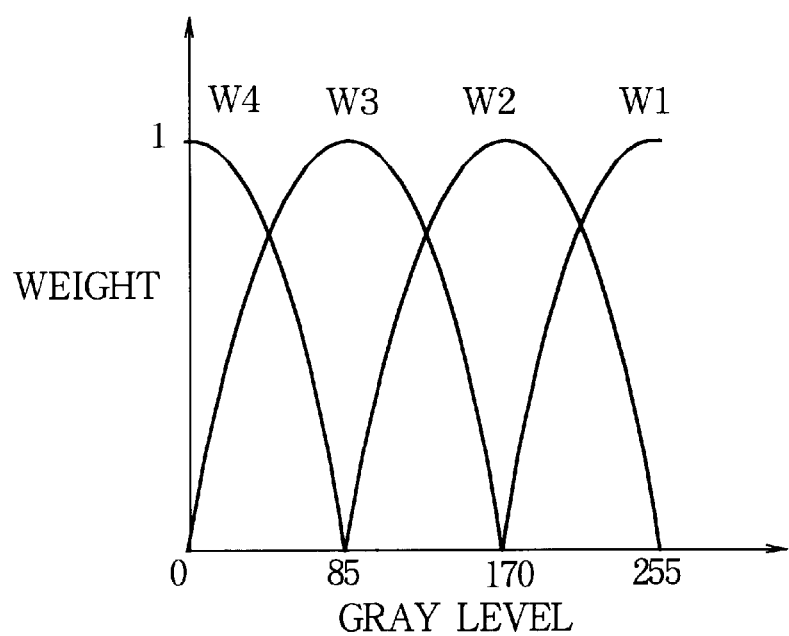
FIG. 6 illustrates weighting functions used in the embodiments.

Referring to FIG. 6, the weighting function W1 used with the highest-frequency periodic function (pattern matrix PM1) has zero weight for gray levels up to one hundred seventy, and rises from zero to one in the range of gray levels from one hundred seventy to two hundred fifty-five. The weighting function W2 used with the second-highest-frequency periodic function (PM2) has positive weights for gray levels from eighty-five to two hundred fifty-five, with a peak weight (1) at one hundred seventy. The next weighting function W3 is positive in the range of gray levels from zero to one hundred seventy, with a peak weight (1) at eighty-five. The weighting function W4 used with the lowest-frequency periodic function (PM4) falls from one to zero in the range of gray levels from zero to eighty-five, and is zero for gray levels above eighty-five. The positive weight values of adjacent weighting functions thus overlap, with one weighting function increasing while the other weighting function decreases. The sum of all the weights at any given gray level is one, or a value close to one. (The sum of sine functions with a phase difference of ninety degrees varies from one to approximately 1.4, which is close enough to one for present purposes.)

The process of multiplying the above periodic functions by weighting functions and summing the results is a type of Fourier integration process.

Figure 7:
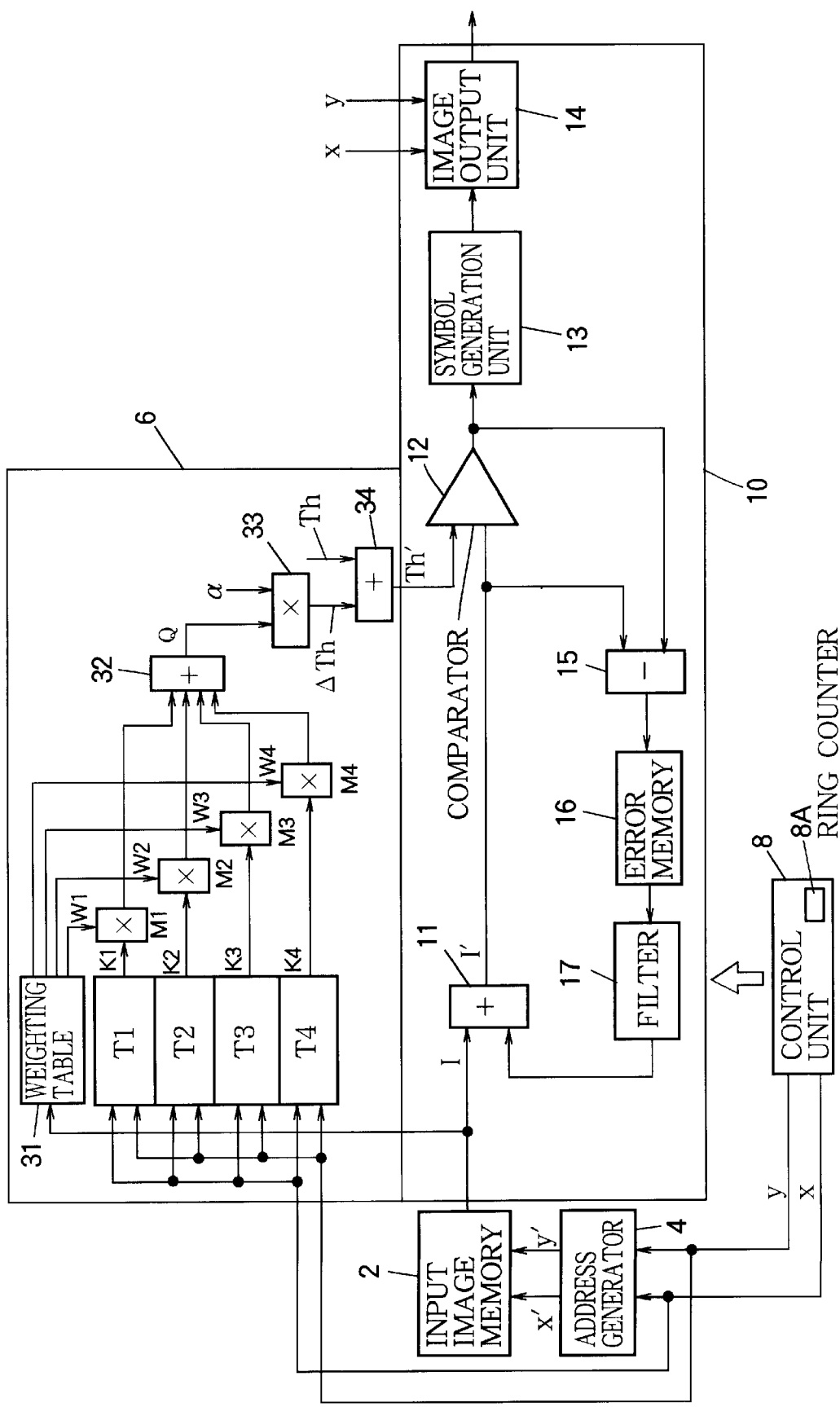
FIG. 7 is a block diagram of a first embodiment of the invention.

Next, a first embodiment of the invention will be described. Referring to FIG. 7, the first embodiment is an image-processing apparatus comprising an input image memory 2, an address generator 4, a threshold processor 6, a control unit 8 with an internal ring counter 8A, and an error diffusion processor 10.

The input image memory 2 receives and stores an externally supplied image signal with two hundred fifty-six gray levels (from 0 to 255). The storage addresses correspond to a Cartesian coordinate system, and will be expressed below as (x', y').

The address generator 4 receives Cartesian coordinates (x, y) of pixels in the image from the control unit 8, and generates corresponding memory addresses (x', y'). These memory addresses are supplied to the input image memory 2, which supplies the corresponding pixel values to the threshold processor 6 and error diffusion processor 10. The addresses are generated in a raster-scan sequence, starting in the top left corner of the image, following each horizontal scanning line from left to right, proceeding downward from one horizontal scanning line to the next, and ending in the bottom right corner.

The error diffusion processor 10 comprises an adder 11, a comparator 12, a symbol generation unit 13, an image output unit 14, a subtractor 15, an error memory 16, and a digital filter 17.

The adder 11 adds each pixel value I received from the input image memory 2 to an error diffusion value received from the digital filter 17, obtaining a modified pixel value I'.

The comparator 12 compares the modified pixel value I' with a modified threshold Th' supplied by the threshold processor 6, outputs the maximum gray level ($I_{max}$, equal to 255) if I' is equal to or greater than Th', and outputs the minimum gray level ($I_{min}$, equal to 0) otherwise.

The symbol generation unit 13 converts the values (0, 255) output by the comparator 12 to bit values or symbol values (0, 1).

The image output unit 14 temporarily stores the bit values generated by the symbol generation unit 13, and outputs them in correspondence to image-coordinate information (x, y).

The subtractor 15 subtracts the value ($I_{max}$ or $I_{min}$) output by the comparator 12 from the modified pixel value I' input to the comparator 12 to obtain their difference, which is the quantization error of the pixel.

The error memory 16 temporarily stores the quantization errors found by the subtractor 15 for the current horizontal scanning line and the preceding line. At any given instant, the error memory 16 holds quantization error data for all pixels to the left of the present pixel in the same scanning line, and for all pixels in the scanning line immediately above.

The digital filter 17 selects four of the quantization error values stored in the error memory 16, calculates a weighted sum of the selected error values, and provides the result to the adder 11.

The threshold processor 6 comprises a weighting table 31, further tables T1, T2, T3, T4, multipliers M1, M2, M3, M4, an adder 32, another multiplier 33, and another adder 34.

The weighting table 31 stores the weighting functions W1, W2, W3, W4 described above. For each weighting function, the weighting table 31 stores weights from zero to one as functions of gray levels from zero to two hundred fifty-five, as depicted in FIG. 6. Alternatively, the sine curve of weighting function W2 is stored, with supplementary logic for shifting this curve to the left or right to obtain the other weighting functions. The weighting table 31 receives the gray level of a pixel from the input image memory 2, and outputs four corresponding weights W1, W2, W3, W4.

Tables T1, T2, T3, T4 store four periodic functions built from repetitions of the four pattern matrices PM1, PM2, PM3, PM4 as described above. Each table is structured to receive a pair of Cartesian coordinates (x, y) and output the value of the corresponding periodic function at that coordinate position. The table may simply store the function values at each coordinate position in the image plane. Alternatively, the table may store one copy of the corresponding pattern matrix, supplemented by addressing logic for converting image coordinates (x, y) to positions in the pattern matrix.

Figure 8:
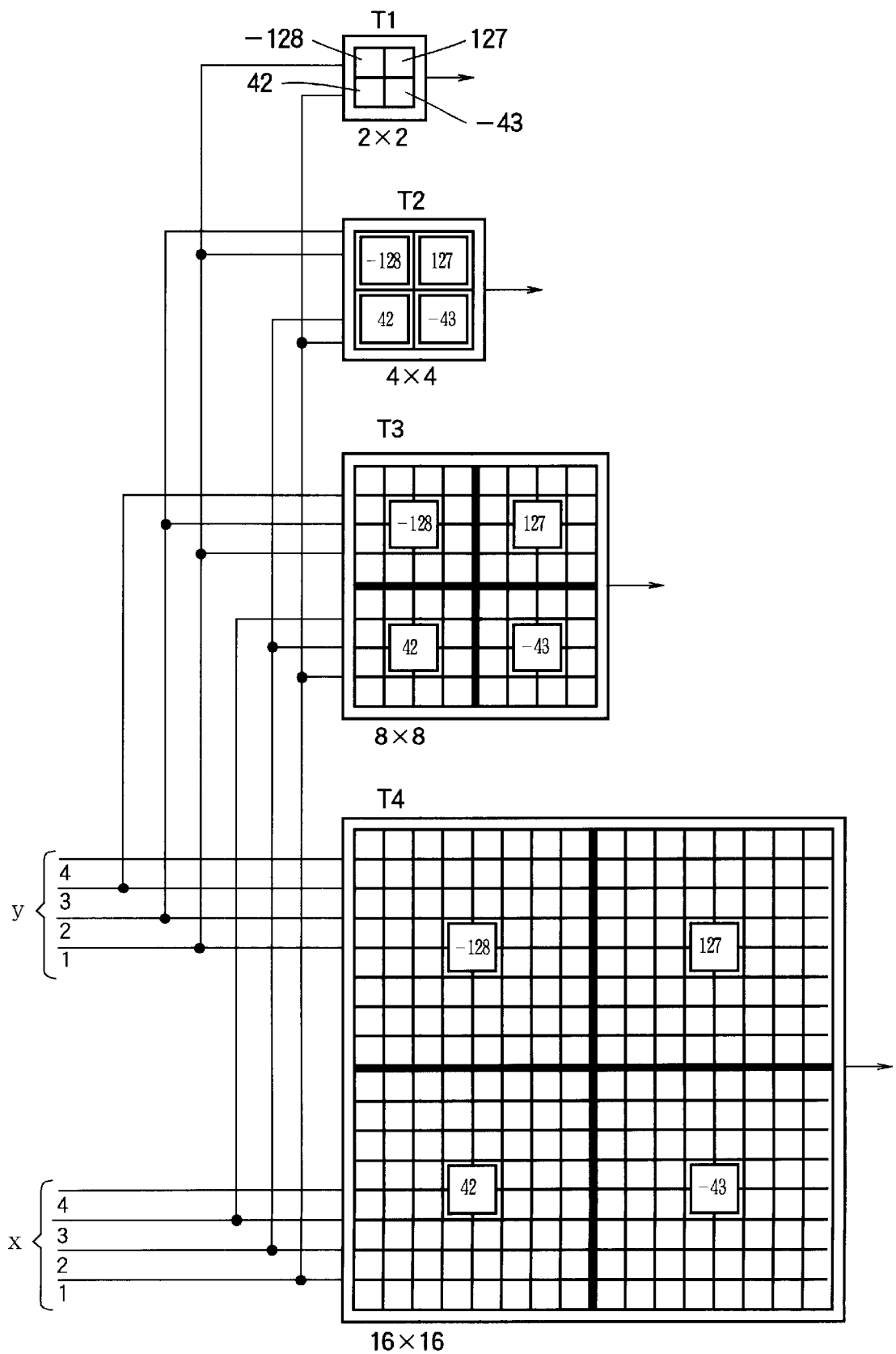
FIG. 8 illustrates a method of addressing tables T1 to T4 in FIG. 7.

When the pattern matrices have sizes (numbers of pixels) that are powers of two, as in the present case, the coordinate conversion can be carried out as shown in FIG. 8. Table T1 is addressed by the least significant bit of the x-coordinate, and the least significant bit of the y-coordinate. Table T2 is addressed by two least significant bits of each coordinate. Table T3 is addressed by the three least significant bits of each coordinate. Table T4 is addressed by the four least significant bits of each coordinate. As the image is read from the input image memory 2, each position in each table is accessed repeatedly by means of the ring counter 8A in the control unit 8.

Figure 9:
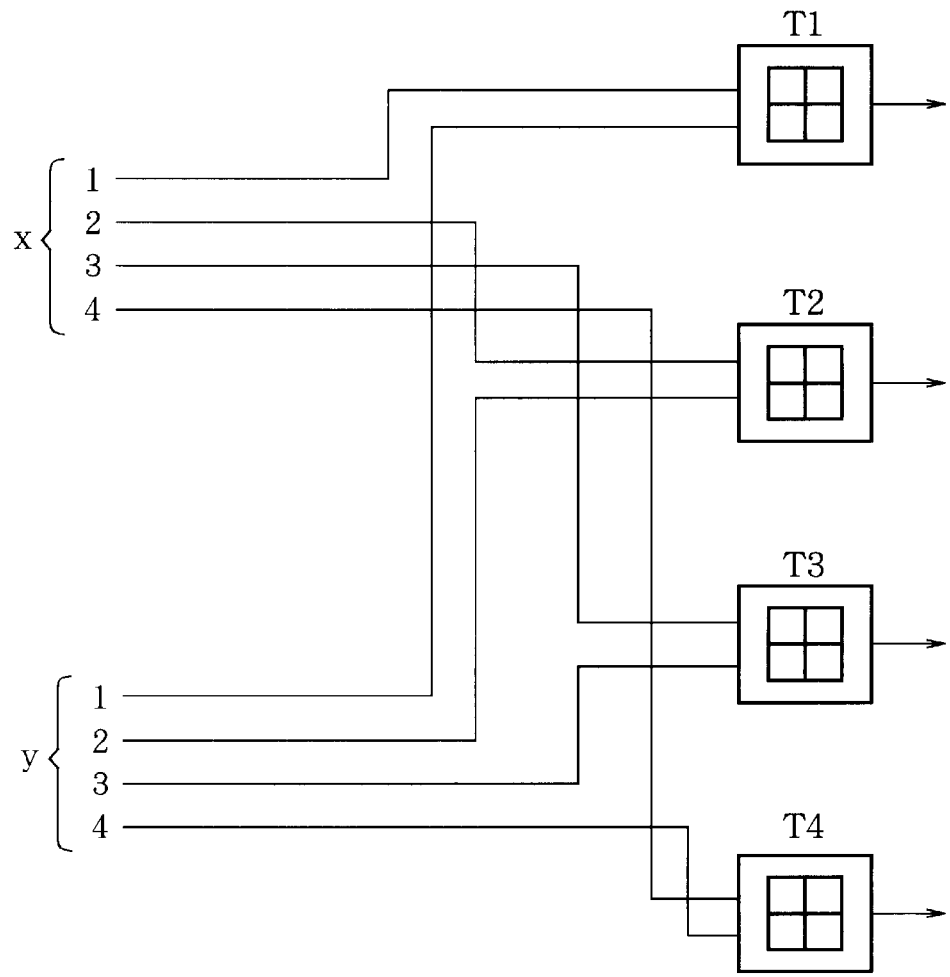
FIG. 9 illustrates an alternative method of addressing tables T1 to T4 in FIG. 7.

When the value in each quadrant of each table is also constant, as in the present case, the addressing process can be further simplified as shown in FIG. 9. Each table stores only four values. Table T1 is addressed by the least significant bit of each coordinate. Table T2 is addressed by the second-least significant bit of each coordinate. Table T3 is addressed by the third-least significant bit of each coordinate. Table T4 is addressed by the fourth-least significant bit of each coordinate. When the first eight pixels of an image are read from the input image memory 2, for example, table T4 returns the same value eight times.

The values output from tables T1, T2, T3, T4 will be denoted K1, K2, K3, K4, respectively.

Multiplier M1 multiplies the periodic function value K1 output from table T1 by the weight W1 output from the weighting table 31. Similarly, multiplier M2 multiplies the output K2 of table T2 by weight W2, multiplier M3 multiplies the output K3 of table T3 by weight W3, and multiplier M4 multiplies the output K4 of table T4 by weight W4.

The first adder 32 adds the products obtained by multipliers M1, M2, M3, M4. The resulting sum of products Q is similar to a Fourier series.

Multiplier 33 multiplies the sum Q obtained by adder 32 by a base coefficient $\alpha$. The value of $\alpha$ is a constant supplied by the control unit 8, and is approximately equal to 0.5 in the present embodiment. The output of multiplier 33 is the offset $\Delta$Th. The purpose of multiplication by $\alpha$ is to adjust the range of offset values.

The second adder 34 adds the offset value $\Delta$Th output by the multiplier 33 to the basic threshold value (Th, equal to 128), which is the center value of the gray scale (halfway between 0 and 255). The output of adder 34 is the modified threshold Th' supplied to the comparator 12 in the error diffusion processor 10.

The values of the weighting functions and the value of the base coefficient a should be selected according to the type of output device (for example, a printer). The weighting functions do not have to employ sine or cosine curves as shown in FIG. 6. Depending on the characteristics of the output device, semicircular or triangular weighting functions can be used. The value of $\alpha$ can be decreased to a value less than 0.5, such as 0.4, for example, to decrease the regularity of the dot patterns in the output image, or increased to a value greater than 0.5, such as 0.6, for example, to increase the regularity of the dot patterns.

The embodiment shown in FIG. 7 comprises well-known computing hardware elements such as arithmetic and logic processing elements and memory elements. Alternatively, some of these elements can be replaced by software elements executed by a general-purpose processor such as a microprocessor.

Next, the operation of the first embodiment will be described.

Figure 10:
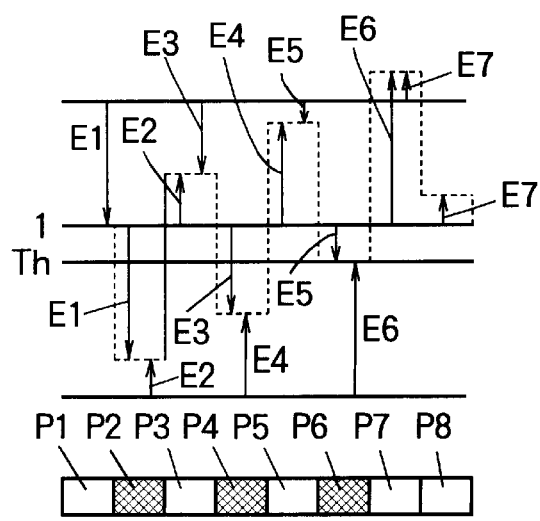
FIG. 10 illustrates conventional error diffusion in one dimension.

By way of introduction, first the conventional error diffusion process will be explained through a simplified one-dimensional example. FIG. 10 shows eight pixels having a constant gray level (I) slightly above a basic threshold value (Th). When these pixels are converted to bi-level pixels, the first pixel P1 is made white (because I>Th), leaving a negative quantization error E1. This error E1 is added to the second pixel P2, which thus becomes black (because I+E1<Th), leaving a positive quantization error E2. This error E2 is added to the third pixel P3, and the above process continues, producing white and black pixels as shown at the bottom of FIG. 10.

In FIG. 10, the quantization error of each pixel is passed to the next pixel to the right. In two dimensions, the quantization error is preferably diffused to several neighboring pixels. In the well-known Floyd-Steinberg error diffusion algorithm, illustrated in FIG. 11, seven sixteenths (7/16) of the quantization error of pixel P1 is added to pixel P1A, three sixteenths (3/16) to pixel P1B, five sixteenths (5/16) to pixel P1C, and one sixteenth (1/16) to pixel P1D.

Figure 12:
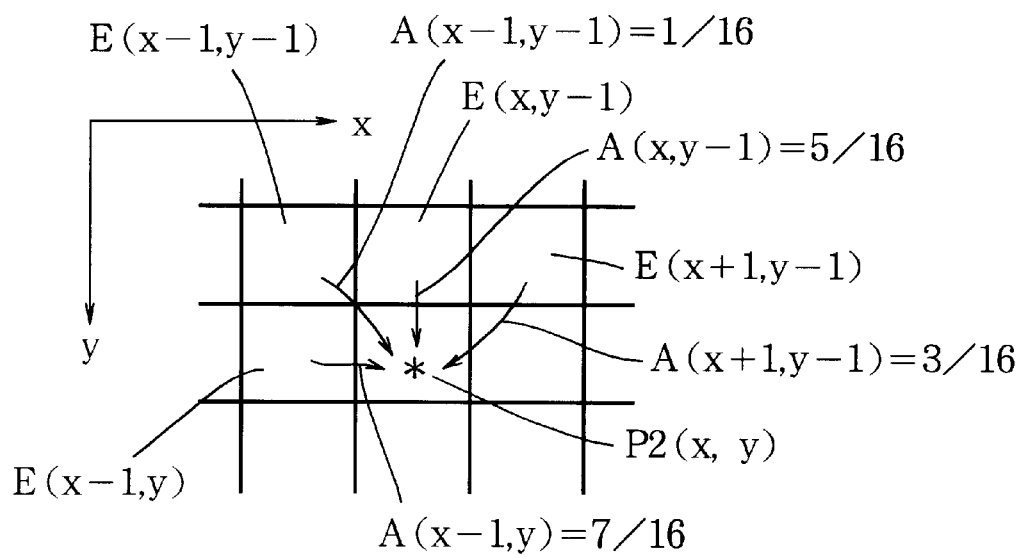

As a result, when an image is processed in raster-scan sequence, each pixel receives diffused quantization error from four previously processed pixels as shown in FIG. 12, in which an asterisk designates the pixel P2(x, y) being processed, E denotes quantization error, and A denotes a diffusion coefficient (7/16, 3/16, 5/16, or 1/16).

Figure 11:
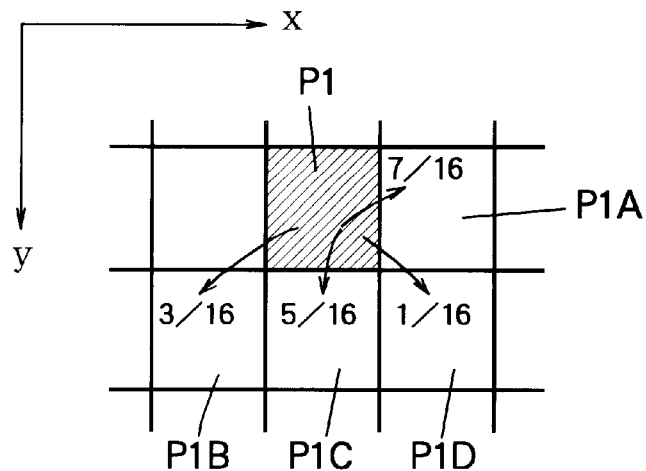
FIGS. 11 and 12 illustrate two-dimensional error diffusion.

The error diffusion process illustrated in FIGS. 11 and 12 is carried out by the error diffusion processor 10 in the present embodiment. FIGS. 11 and 12 also illustrate the coordinate system used in the present embodiment, the positive x-direction extending to the right and the positive y-direction extending downward.

The processing performed by the first embodiment will now be explained with reference to the flowchart in FIGS. 13 and 14.

First, the x and y coordinates are initialized to zero (step 1), and the error memory 16 is initialized to all zero contents (step 2). These steps are performed by the control unit 8.

The following steps form a loop that is repeated once for each pixel in the image.

First, the digital filter 17 calculates the quantization error $E(x, y)$ to be added to the pixel at position (x, y), (step 3). As illustrated in FIG. 12, $E(x, y)$ is calculated by the following weighted sum.

$$E(x, y)=A(x=1, y-1) \cdot E(x-1, y-1) +A(x, y-1) \cdot E(x, y-1) +A(x+1, y-1) \cdot E(x+1, y-1) +A(x-1, y) \cdot E(x-1, y)$$

Next, the adder 11 adds $E(x, y)$ to the pixel value $I(x, y)$ to obtain a modified pixel value $I'(x, y)$ (step 4).

Next, the values $Kj(x, y)$ of the four periodic functions (j=1, 2, 3, 4) at coordinates (x, y) are obtained from tables T1, T2, T3, T4 (step 5).

These values $Kj(x, y)$ are multiplied by corresponding weights $Wj(I(x, y))$ obtained from the weighting table 31, and added by adder 32 to obtain the sum Q. For brevity, $Wj$ will be written instead of $Wj(I(x, y))$ (j=1, 2, 3, 4).

$$Q=K1(x, y) \cdot W1+K2(x, y) \cdot W2+K3(x, y)W3+K4(x, y) \cdot W4$$

Multiplier 33 multiplies this sum Q by the base coefficient α to obtain the offset $\Delta Th(x, y)$, and adder 34 adds the offset $\Delta Th(x, y)$ to the basic threshold Th to obtain the modified threshold $Th'(x, y)$ (step 6).

Next, the comparator 12 compares the modified threshold $Th'(x, y)$ with the modified pixel value $I'(x, y)$ (step 7).

If the modified threshold $Th'(x, y)$ is less than the modified pixel value $I'(x, y)$, then the symbol generation unit 13 outputs the symbol "1" (step 8), and the subtractor 15 calculates the quantization error $E(x, y)$ as the difference $I'(x, y)-I_{max}$ (step 9). If the modified threshold $Th'(x, y)$ is equal to or greater than the modified pixel value $I'(x, y)$, then the symbol generation unit 13 outputs the symbol "0" (step 10), and the subtractor 15 calculates the quantization error $E(x, y)$ as the difference $I'(x, y)-I_{min}$ (step 11). The quantization error $E(x, y)$ calculated in step 9 or step 11 is stored in the error memory 16.

Figure 13:
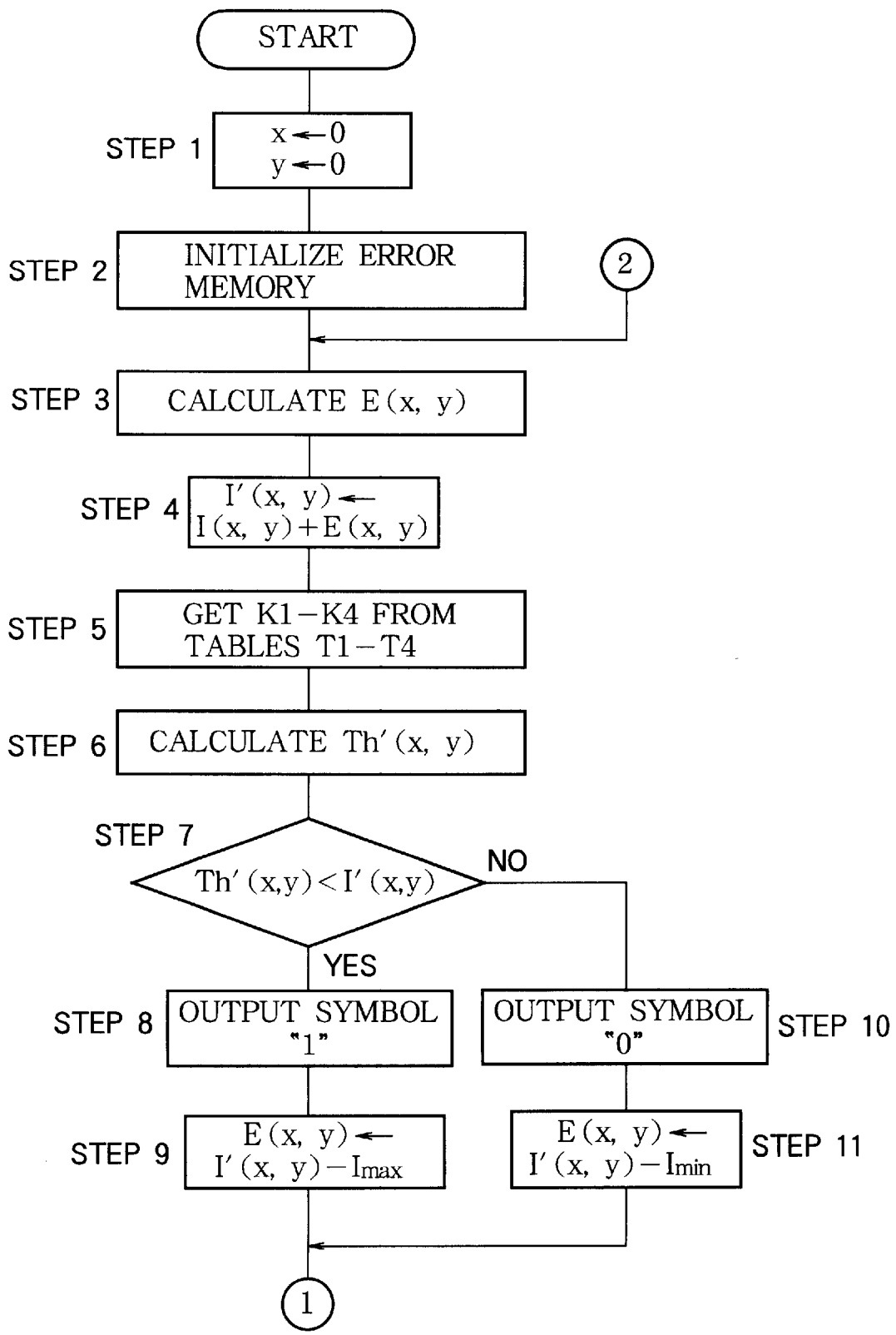
FIGS. 13 and 14 are a flowchart illustrating the operation of the first embodiment.

Incidentally, the same notation $E(x, y)$ is used in FIG. 13 to denote both the quantization error diffused into position (x, y) in steps 3 and 4, and the quantization error diffused out from position (x, y) in steps 9 and 11.

Figure 14:
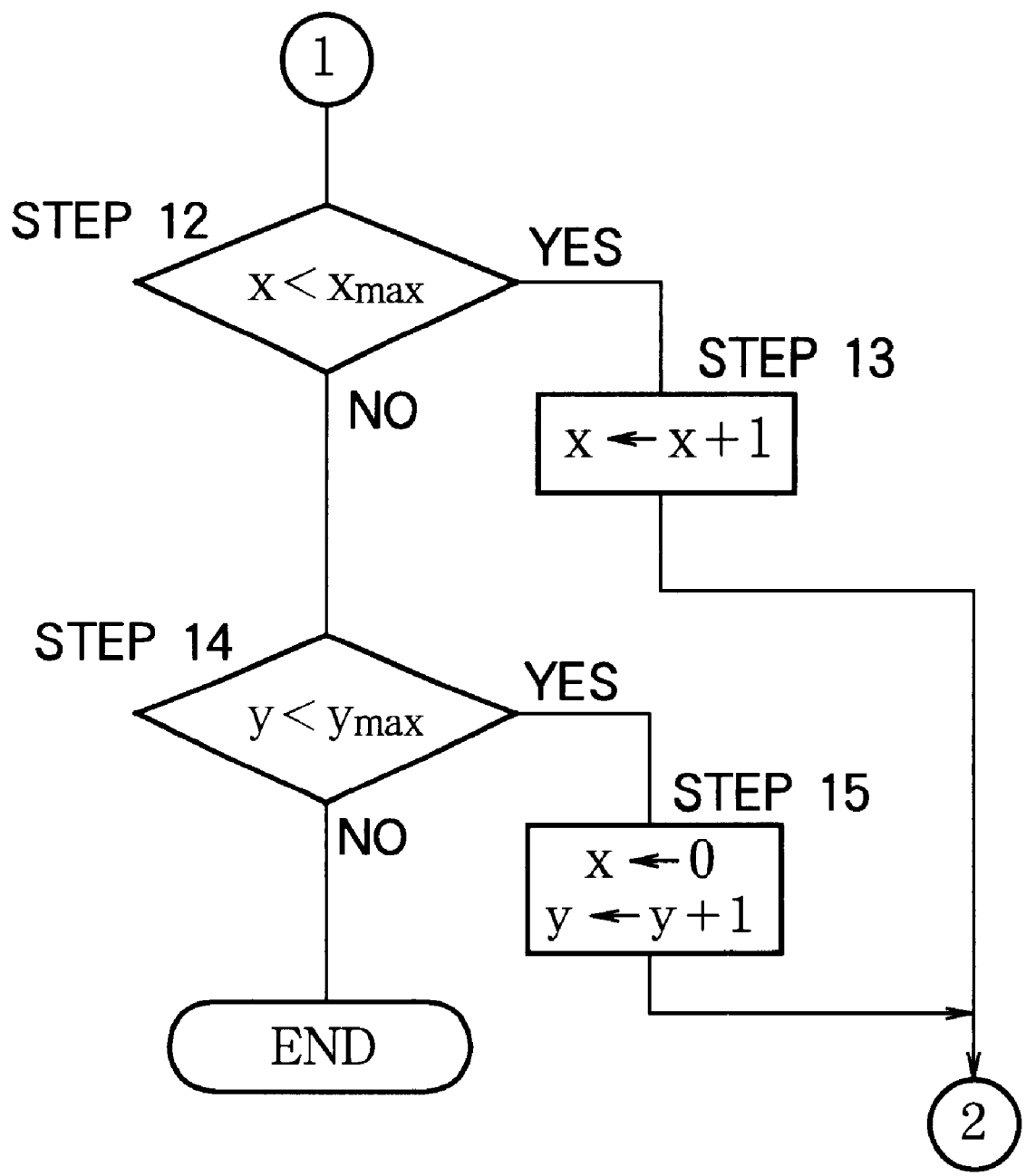

Referring to FIG. 14, following step 9 or step 11, the x-coordinate (x) of the pixel that has just been processed is compared with the maximum x-coordinate ($x_{max}$) of the image (step 12). If x is less than $x_{max}$, then x is incremented (step 13), and the process returns to step 3 to process the next pixel in the same horizontal scanning line. If x is not less than $x_{max}$, then the y-coordinate (y) of the pixel is compared with the maximum y-coordinate ($y_{max}$) of the image (step 14). If y is less than $y_{max}$, then x is set to zero and y is incremented (step 15), and the process returns to step 3 to process the first pixel in the next horizontal scanning line. If y is not less than $y_{max}$, the process ends.

Steps 12 to 15 form a decision procedure that determines whether the entire image has been processed, proceeds to the next pixel if the entire image has not been processed, and otherwise terminates the processing, to await a command to process the next image.

The process described above generates a bi-level image in which the spatial frequencies of an area are constrained by establishing regular, hierarchical frameworks having positions where dots are encouraged to appear, and positions where dots are encouraged not to appear, responsive to the gray level represented by the pseudo-tone pattern of the area. Although a certain degree of randomness still appears in the pseudo-tone patterns, the randomness is constrained; the output dots have a strong tendency to appear at or near preferred positions, and the dot patterns show large-scale regularity. The dot noise produced by conventional error diffusion is thereby reduced. In a printer, dot positions can be controlled according to the characteristics of the printer, to obtain an output image of high quality.

The pattern matrices from which the periodic functions are generated push pixels toward white in the second and fourth quadrants, and toward black in the first and third quadrants. The output dot patterns are thereby given a desirable checkerboard appearance. The quadrants of the pattern matrices expand hierarchically from the first periodic function to the fourth periodic function, and the dot patterns show similar hierarchical regularity.

Although the first embodiment uses an error diffusion processor 10, this can be replaced by a direct dither processing unit of the type that employs a dither matrix. The threshold processor 6 then offsets each of the threshold values appearing in the dither matrix. That is, a matrix of fixed thresholds is replaced with a matrix in which the thresholds are expressed as Fourier series.

Next, a second embodiment will be described.

Figure 15:
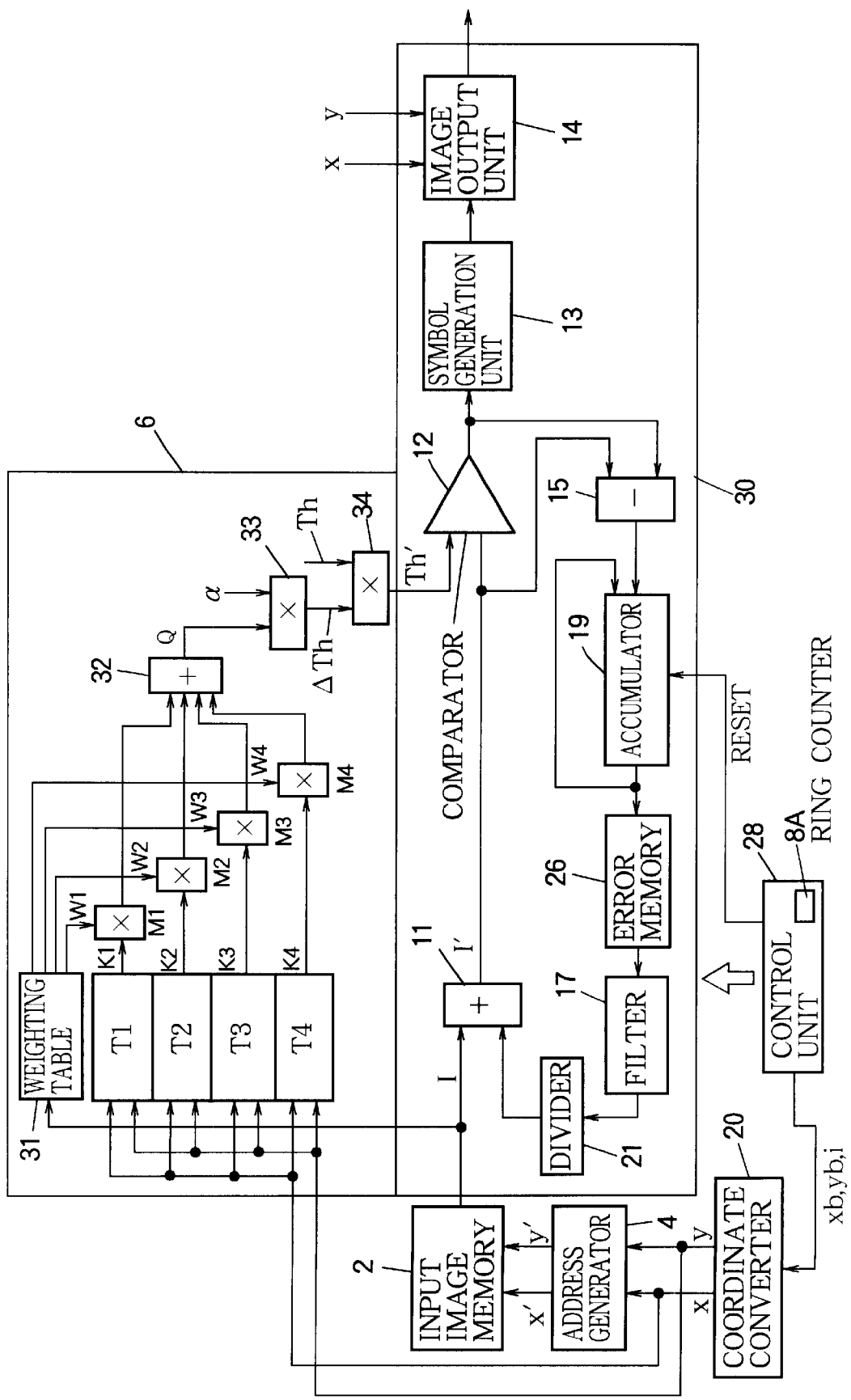
FIG. 15 is a block diagram of a second embodiment of the invention.

Referring to FIG. 15, the second embodiment inserts an accumulator 19 between the subtractor 15 and error memory 26, a coordinate converter 20 between the control unit 28 and address generator 4, and a divider 21 between the digital filter 17 and adder 11.

Figure 16:
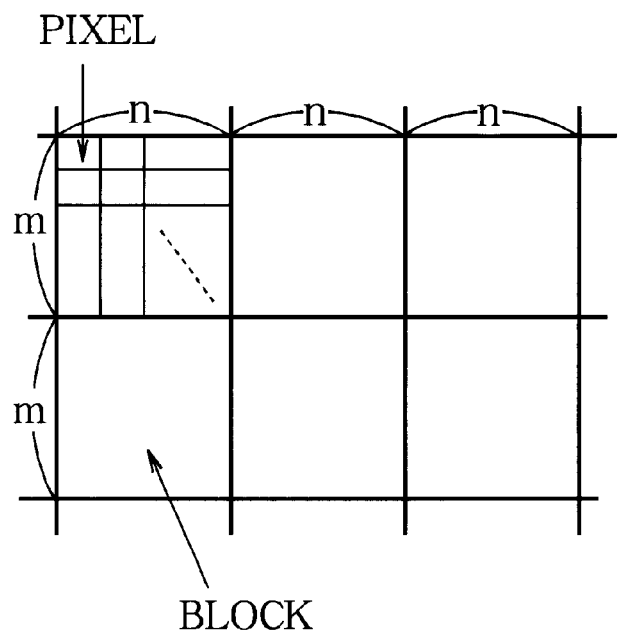
FIG. 16 illustrates the division of an image into blocks in the second embodiment.

The second embodiment performs error diffusion on a block-by-block basis. Referring to FIG. 16, the input image is divided into rectangular m-by-n blocks, where m and n are positive integers. The entire image is covered by these rectangular blocks.

The control unit 28 controls the image processing so that, instead of processing one horizontal scanning line at a time, the error diffusion processor 30 processes one block at a time. First the block in the upper-left corner is processed, the pixels within this block being selected in raster-scan sequence, from left to right and from top to bottom. Then the next block to the right is similarly processed. When the right edge of the image is reached, the leftmost block in the next row of blocks is processed.

In the description below, blocks are identified by block coordinates (xb, yb) and pixels within a block are identified by an index (i). In the processing of the first block, for example, xb and yb are zero, and i varies from one (1) to a limit L equal to the number of pixels per block (L=m·n).

In each block, the accumulator 19 calculates the cumulative sum of the quantization errors supplied by the subtractor 15. At the end of the block, the cumulative sum is stored in the error memory 26, and the accumulator 19 is reset by the control unit 28 in preparation for the next block.

The error memory 26 thus stores one error value per block, instead of one error value per pixel. At any given moment, the error memory 26 contains error values for the blocks to the left of the block now being processed in the same row, and for all blocks in the row just above.

Figure 17:
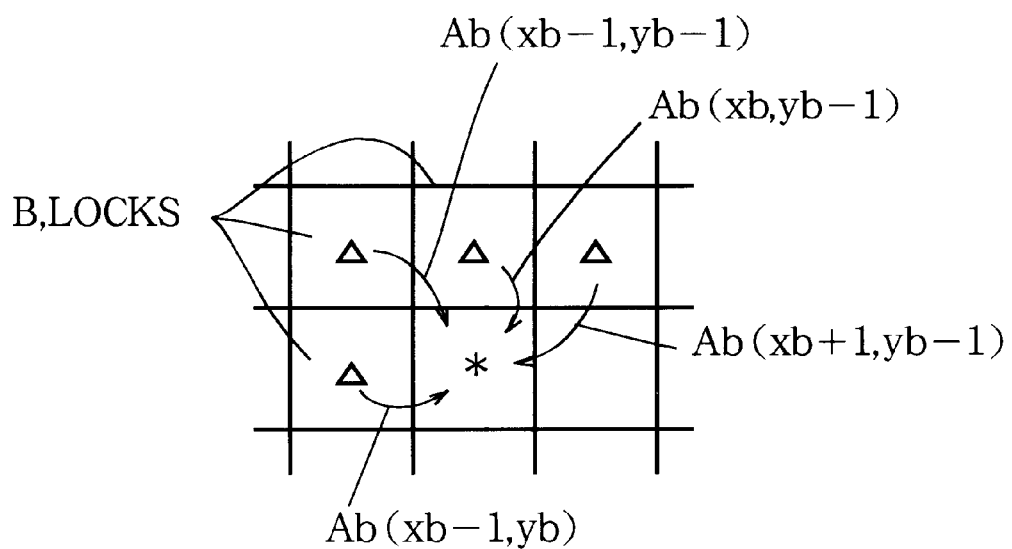
FIG. 17 illustrates block error diffusion in the second embodiment.

The digital filter 17 performs the same type of calculation as in the first embodiment, using block coordinates and block error values instead of pixel coordinates and pixel error values. As shown in FIG. 17, each block receives error diffusions from the three neighboring blocks in the row above and the block immediately to the left in the same row. The diffusion coefficients Ab are, for example, the same as the coefficients A in FIG. 12.

The coordinate converter 20 converts the block coordinates (xb, yb) and pixel index value (i) output by the control unit 28 to pixel coordinates (x, y).

The divider 21 divides the output of the digital filter 17 by the number of pixels per block (L), thereby obtaining the per-pixel error diffusion. If L is a power of two, the divider 21 can be configured as a bit shifter.

The threshold processor 6 performs the same processing as in the first embodiment, obtaining a separate threshold offset ΔTh(x, y) for each pixel. The order in which the pixels are processed differs from the first embodiment, but the offset values are the same.

Figure 18:
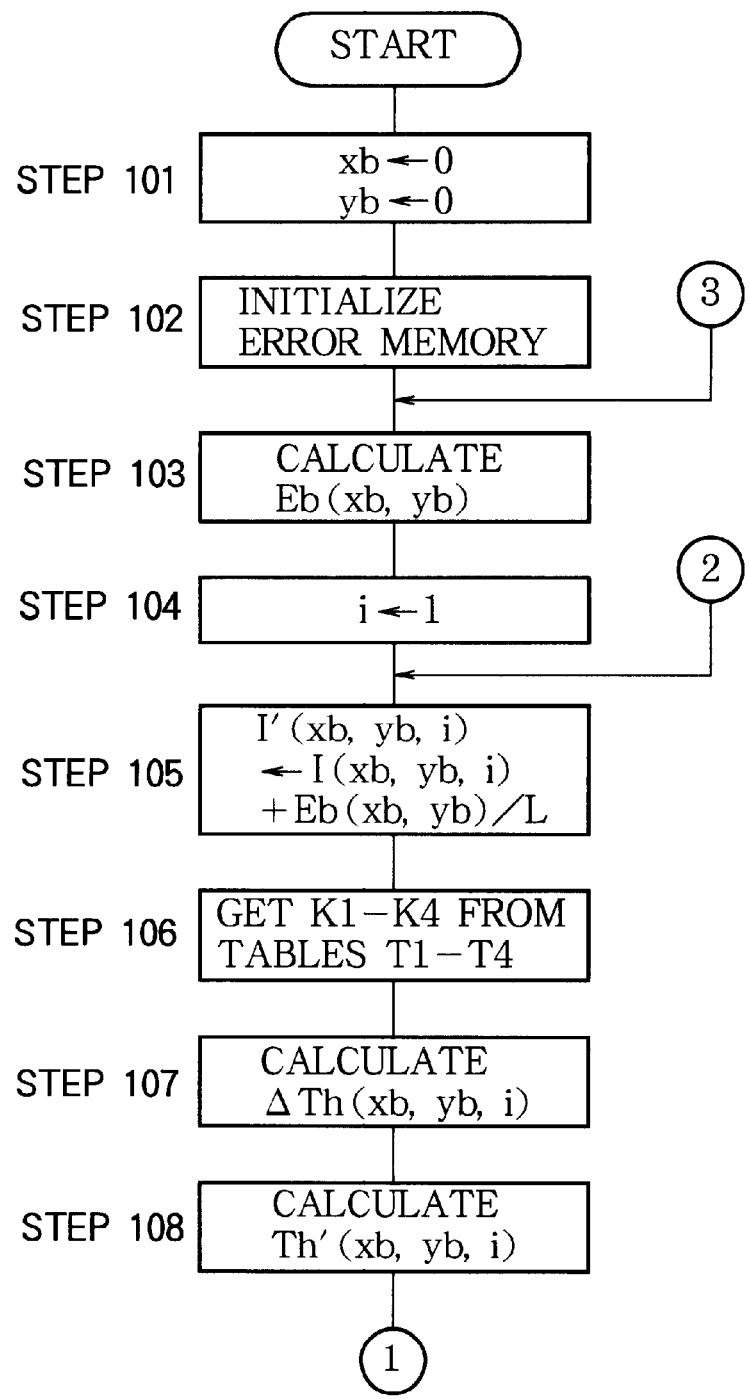
FIGS. 18 and 19 are a flowchart illustrating the operation of the second embodiment.

Next, the operation of the second embodiment will be described with reference to the flowchart in FIGS. 18 and 19.

To begin the processing of an image, the block coordinates (xb, yb) are cleared to zero (step 101) and the error memory 26 is initialized (step 102).

Next, the digital filter 17 calculates the total error Eb(xb, yb) diffused into block (xb, yb) as follows (step 103), using the block error values (Eb) of neighboring blocks stored in the error memory 26, and diffusion coefficients (Ab) as shown in FIG. 17.

$$Eb(xb, yb)=Ab(xb-1, yb-1)\cdot Eb(xb-1, yb-1) +Ab(xb, yb-1)\cdot Eb(xb, yb-1) +Ab(xb+1, yb-1)\cdot Eb(xb+1, yb-1) +Ab(xb-1, yb)\cdot Eb(xb-1, yb)$$

The pixel index (i) is now initialized to one, indicating the pixel in the top left corner of block (xb, yb) (step 104).

The adder 11 modifies the pixel value I(xb, yb, i) by adding the quotient of Eb(xb, yb) divided by the number of pixels (L) in the block, obtaining a modified pixel value I'(xb, yb, i) (step 105).

Next, the values K1, K2, K3, K4 of the four periodic functions at coordinates (x, y) are obtained from tables T1, T2, T3, T4 (step 106). The coordinates (x, y) are generated by the coordinate converter 20, and correspond to the block coordinates and index (xb, yb, i) output by the control unit 28.

Next, the periodic function values K1, K2, K3, K4 are multiplied by corresponding weights W1, W2, W3, W4 obtained from the weighting table 31, and the products are added by adder 32 to obtain a sum Q, as in the first embodiment. Multiplier 33 multiplies the sum Q by the base coefficient a to obtain the offset ΔTh(xb, yb, i) (step 107).

Adder 34 adds the offset ΔTh(xb, yb, i) to the basic threshold Th to obtain the modified threshold Th'(xb, yb, i) (step 108).

Figure 19:
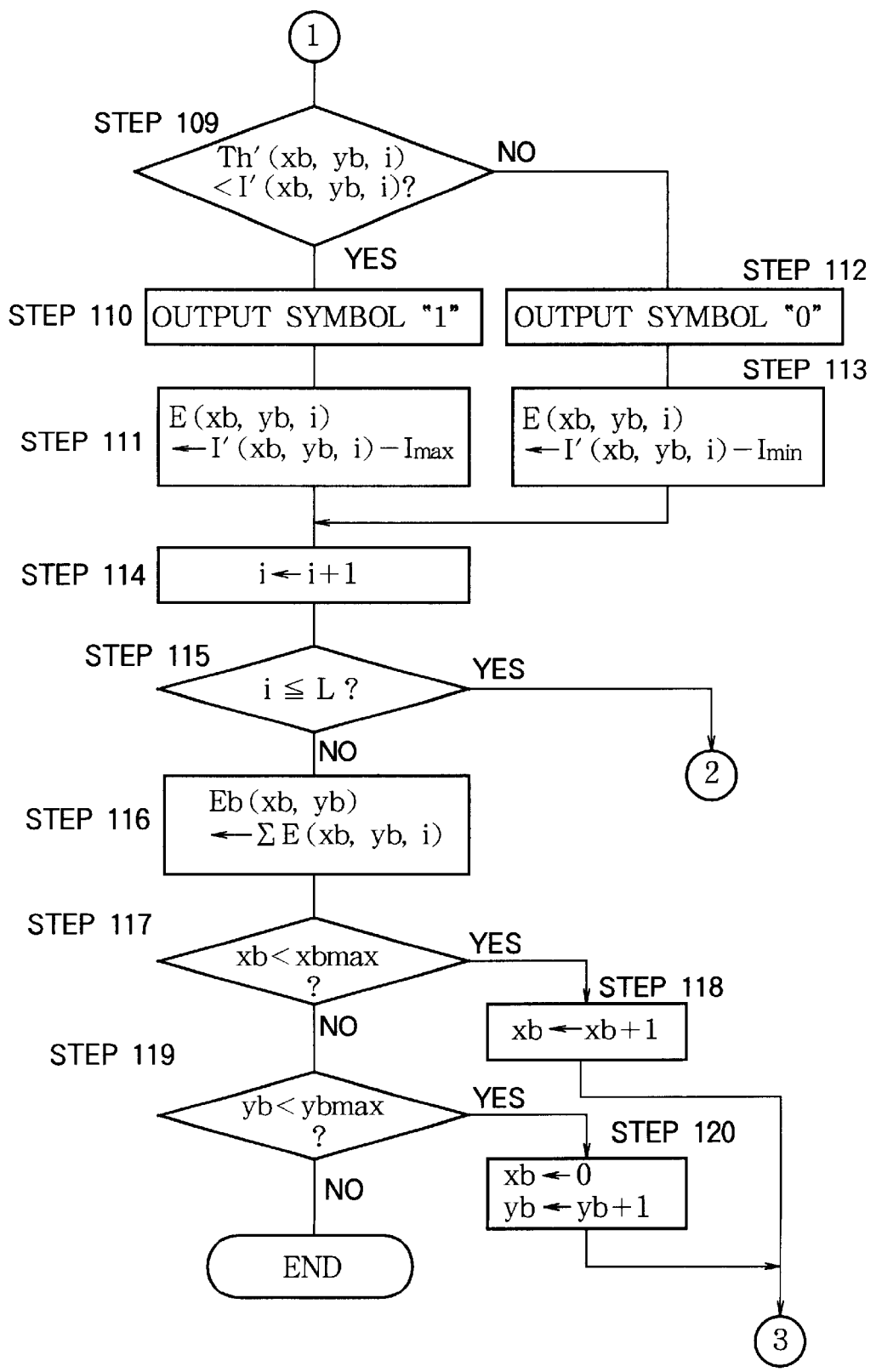

Referring to FIG. 19, the comparator 12 compares the modified threshold Th'(xb, yb, i) with the modified pixel value I'(xb, yb, i) (step 109).

If the modified threshold Th'(xb, yb, i) is less than the modified pixel value I'(xb, yb, i), then the symbol generation unit 13 outputs the symbol "1" (step 110), and the subtractor 15 calculates the quantization error E(xb, yb, i) of the pixel just processed as the difference I'(xb, yb, i)–$I_{max}$ (step 111). If the modified threshold Th'(xb, yb, i) is equal to or greater than the modified pixel value I'(xb, yb, i), then the symbol generation unit 13 outputs the symbol "0" (step 112), and the subtractor 15 calculates the quantization error E(xb, yb, i) as the difference I'(xb, yb, i)–$I_{min}$ (step 113).

Next, the pixel index (i) is incremented (step 114), and compared with the number (L) of pixels per block (step 115). If the incremented pixel index is equal to or less than L, the process returns to step 105 to process the next pixel in the block.

As steps 105 to 115 are repeated for each pixel in the block, the accumulator 19 calculates a cumulative sum ΣE(xb, yb, i) of the quantization errors of the pixels. When the incremented pixel index exceeds L, this cumulative sum is stored in the error memory 26 as the block error Eb(xb, yb) (step 116). The same notation Eb(xb, yb) is used in FIGS. 18 and 19 to denote both the quantization error diffused into block (xb, yb) in step 103, and the quantization error diffused out from block (xb, yb) in step 116.

Next, the x-coordinate (xb) of the block that has just been processed is compared with the maximum block x-coordinate ($xb_{max}$) in the image (step 117). If xb is less than $xb_{max}$, then xb is incremented (step 118), and the process returns to step 103 to process the next block in the same horizontal row. If xb is not less than $xb_{max}$, then the y-coordinate (yb) of the block is compared with the maximum block y-coordinate ($yb_{max}$) in the image (step 119). If yb is less than $yb_{max}$, then xb is set to zero and yb is incremented (step 120), and the process returns to step 103 to process the first block in the next row. If yb is not less than $yb_{max}$, the process ends.

Steps 117 to 120 cause all blocks to be processed in turn, until the entire image has been processed.

The second embodiment has the same effect as the first embodiment in imposing a desirable regularity on the dot patterns used to represent each gray level, thus reducing dot noise in the converted image. In addition, the amount of randomness appearing in the output dot patterns decreases as the block size increases, providing a method of controlling the amount of randomness.

A further advantage of the second embodiment is that the digital filter 17 has to operate only once per block, instead of once per pixel, reducing the filtering processing load by a factor of L. Accesses to the error memory 26 are also reduced by a factor of L. The error diffusion processor 30 in the second embodiment thus operates more efficiently than the error diffusion processor 10 in the first embodiment.

In a variation of the second embodiment, the quantization error diffused into a block is distributed in a weighted manner among the pixels in the block, according to the pixel position, for example, instead of being distributed to all pixels equally.

Next, a third embodiment will be described. The third embodiment reduces the gray scale of the input image to four output levels instead of two.

Figure 20:
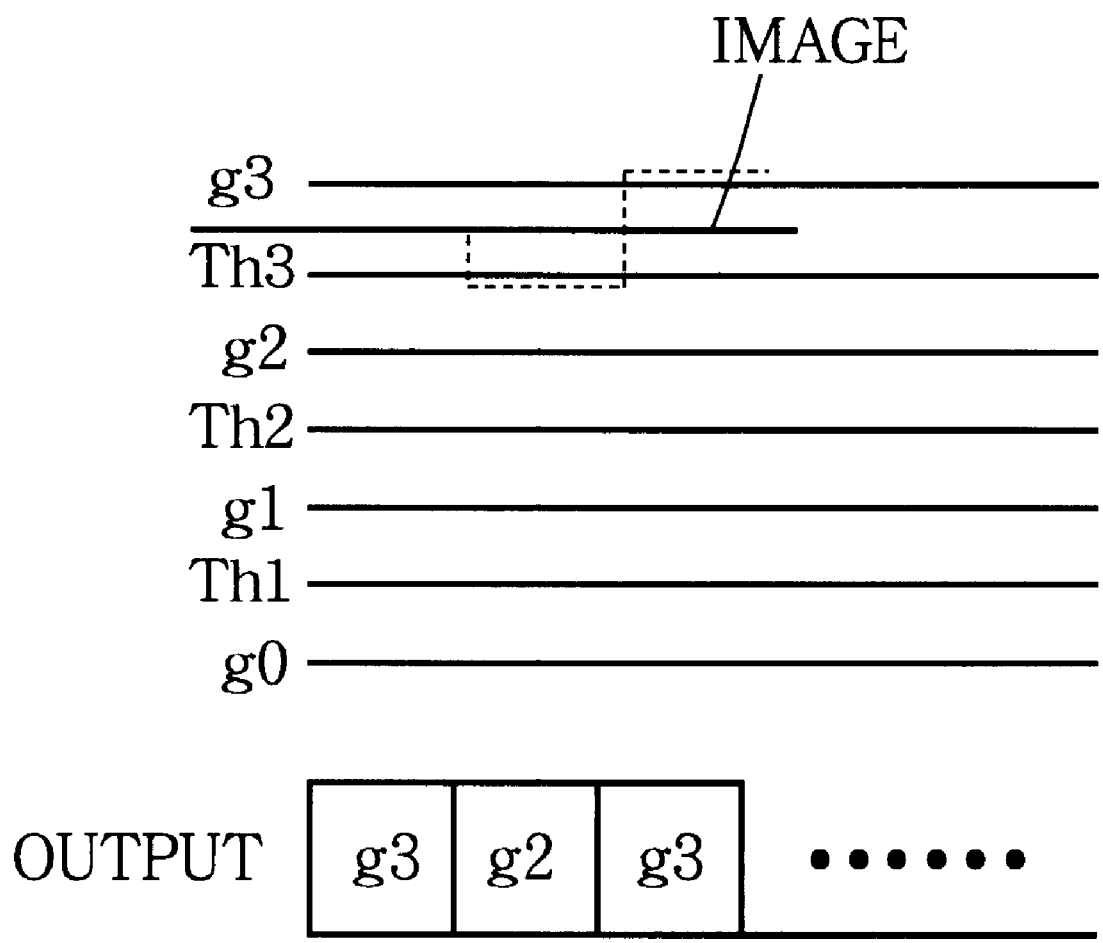
FIG. 20 illustrates thresholds employed in a third embodiment of the invention.

The four output levels are denoted g0 (black), g1 (dark gray), g2 (light gray), and g3 (white) in FIG. 20. There are now three basic thresholds: Th1 midway between g0 and g1, Th2 midway between g1 and g2, and Th3 midway between g2 and g3. Each of these basic thresholds is modified by the offset ΔTh calculated by the threshold processor 6 for each pixel. The threshold processor 6 operates in the same way as in the first or second embodiment, except that the value of the base coefficient α is preferably smaller than in those embodiments, and the second adder 34 adds ΔTh to each of the basic thresholds Th1, Th2, Th3 separately, generating three modified thresholds Th1', Th2', Th3'.

The error diffusion processor 10 in the third embodiment is the same as the error diffusion processor 10 in the first embodiment, with the following modifications. The comparator 12 compares the modified pixel value output by the adder 11 with the modified thresholds Th1', Th2', Th3' in turn to select one of the four gray levels g0, g1, g2, g3. The symbol generation unit 13 outputs symbols "0" "1," "2," "3" corresponding to these gray levels. The subtractor 15 subtracts the selected gray level from the modified pixel value to obtain the quantization error.

In a variation of the third embodiment, the block error diffusion processor 10 of the second embodiment is employed, with similar modifications.

In the third embodiment, a gray level higher than threshold Th3 but lower than level g3, for example, is expressed as a pattern of dots with levels g2 and g3, as indicated at the bottom of FIG. 20. The same benefits as in the first and second embodiments are obtained in terms of increased regularity of the dot patterns expressing each gray level in the input image.

Other variations of the third embodiment can be obtained by changing the number of output levels from four to three, five, or any larger number N.

Next, a fourth embodiment will be described. The fourth embodiment processes a color image.

Figure 21:
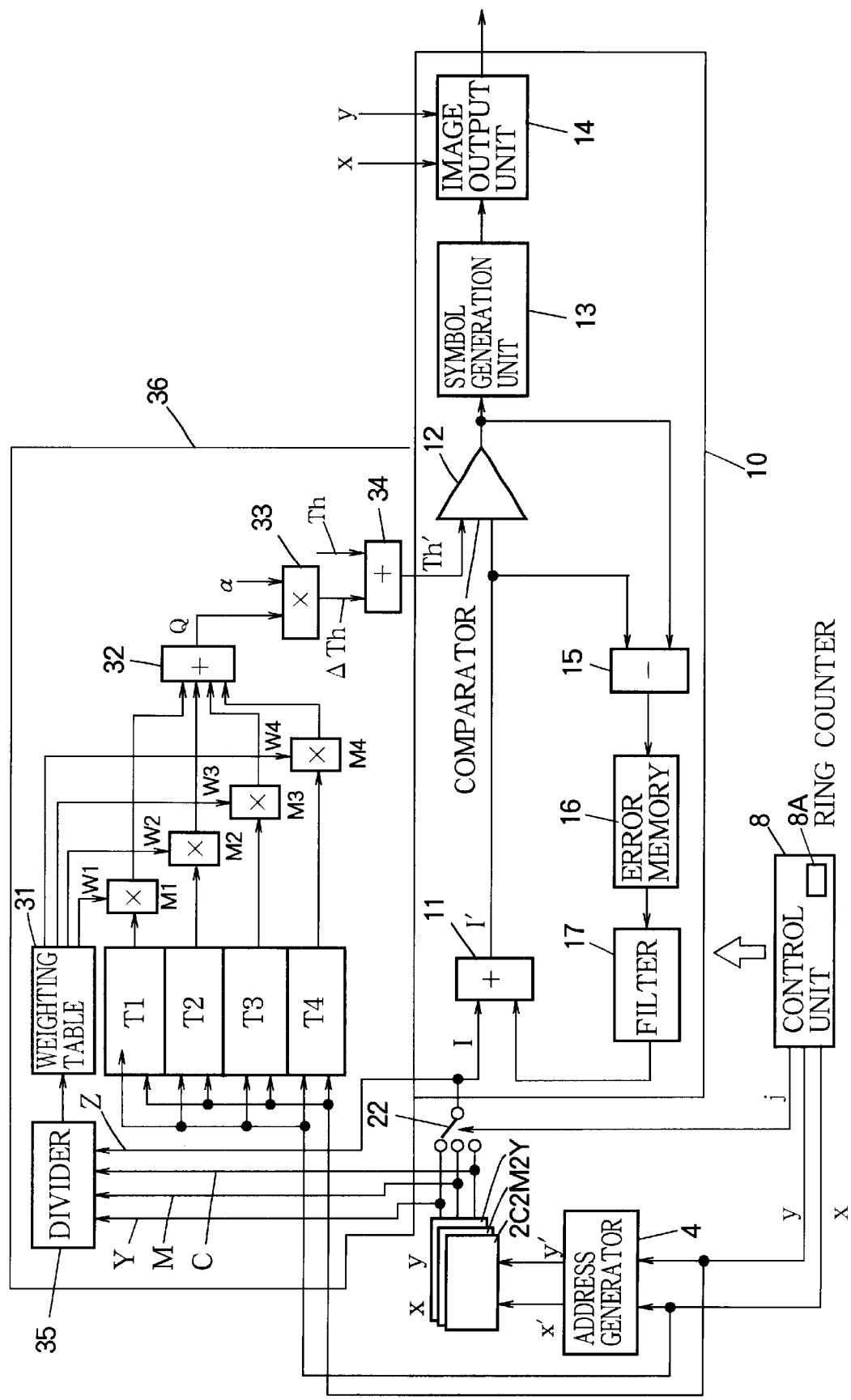
FIG. 21 is a block diagram of a fourth embodiment of the invention.

Referring to FIG. 21, the input image in the fourth embodiment comprises cyan, magenta, and yellow color planes. Three input image memories 2C, 2M, 2Y are provided for storing the pixel values in these three color planes. The addresses (x', y') generated by the address generator 4 are supplied to all three input image memories 2C, 2M, 2Y simultaneously. A switch 22 selects the output from one input image memory, under control of a signal (j) from the control unit 8. First, input image memory 2C is selected and the cyan plane of the entire image is processed. Next, input image memory 2M is selected and the magenta plane of the entire image is processed. Finally, input image memory 2Y is s elected and the yellow plane of the entire image is processed.

The threshold processor 36 in the fourth embodiment has an additional divider 35 that receives the pixel values C, M, Y output from the three input image memories 2C, 2M, 2Y, and the pixel value Z selected by the switch 22 (Z=C, M, or Y). The divider 35 calculates the following quantity, which is supplied to the weighting table 31.

$$I_{max} \cdot Z/(C+M+Y)$$

When the output image is printed by an ink-jet printer, and an arbitrary color is simulated by overlaid patterns of cyan, magenta, and yellow dots, the quotient $Z/(C+M+Y)$ indicates the share of the selected color plane in the total amount of ink. The weights W1, W2, W3, W4 used in each color plane are thereby controlled according to the relative quantity of ink printed in each of the three primary colors. Accordingly, the dot pattern of each one of the three primary colors is controlled in a way that takes the space occupied by the other two primary colors into account.

In addition, when the values C, M, Y obtained from the input image memories 2C, 2M, 2Y are small, the dot patterns in each color plane are controlled so that dots of different colors do not overlap and clumping is avoided. Specifically, the phase of the periodic functions is varied from one color plane to another, by providing the control signal (j) as a third input to tables T1, T2, T3, T4, by means of signal lines not shown in FIG. 21.

Conversely, when the C, M, and Y values are large, the dot patterns of different colors are controlled so as to overlap, by aligning the phases of the periodic functions in each plane, which results in better rendition of pseudo-tone patterns in the color image.

Aside from the differences described above, in the processing of each color plane, the threshold processor 36 and error diffusion processor 10 operate as in the first embodiment.

The fourth embodiment provides the same advantage as the preceding embodiments in reducing dot noise, with the additional advantage of enabling the dot patterns in different color planes to be controlled so that the dot patterns are overlaid on one another in desirable ways.

In a variation of the fourth embodiment, block error diffusion is employed as in the second embodiment.

In another variation, the number of output levels in each color plane is increased to a number greater than two, as in the third embodiment.

As described above, the first embodiment performs a constrained error diffusion process that produces a bi-level image with reduced dot noise. The second embodiment performs a constrained block error diffusion process that also produces a bi-level image with reduced dot noise. The third embodiment extends these processes to output images with more than two levels. The fourth embodiment extends these processes to color images, permitting control over the way in which dot patterns in different color planes are overlaid. All of these embodiments enhance the quality of images printed by dot printing devices such as ink-jet printers.

It is anticipated that the invention can also enhance the appearance of images displayed on various types of dot-matrix display devices.

Those skilled in the art will recognize that further variations are possible within the scope claimed below.

What is claimed is:

1. A method of processing input image data to generate pseudo-tone patterns, comprising the steps of:

(a) modifying at least one predetermined threshold by combining said predetermined threshold simultaneously with at least two periodic functions having different periods, said periodic functions being functions of position in said input image data;

(b) comparing said input image data with the modified threshold; and (c) generating output image data with N levels, using results obtained in said step (b), levels present in the input image data but not present among said N levels being simulated by pseudo-tone patterns in said output image data with N levels, N being an integer greater than one.

2. The method of claim 1, wherein said input image data represent a plurality of horizontal scanning lines, and said periodic functions are one-dimensional, following said horizontal scanning lines.

3. The method of claim 1, wherein said periodic functions are two-dimensional.

4. The method of claim 1, wherein said step (c) comprises error diffusion.

5. The method of claim 4, wherein said step (c) further comprises the steps of:

(d) dividing said input image data into blocks;

(e) calculating a total quantization error in each of said blocks; and (f) distributing weighted portions of said total quantization error to neighboring blocks.

6. The method of claim 1, wherein N is equal to two.

7. The method of claim 1, wherein N is greater than two.

8. The method of claim 1, wherein said input image data are color image data comprising a plurality of color planes, and said steps (a), (b), (c) are applied separately to each of said color planes.

9. A method of processing input image data to generate pseudo-tone patterns, comprising the steps of:

(a) modifying at least one predetermined threshold according to at least two periodic functions having different periods, said periodic functions being functions of position in said input image data by multiplying each of said periodic functions by a weighting function to obtain products, using different weighting functions for different periodic functions, said weighting functions being functions of the levels in said input image data, and adding the products to obtain a sum;

(b) comparing said input image data with the modified threshold; and (c) generating output image data with N levels, using results obtained in said step (b), levels present in the input image data but not present among said N levels being simulated by pseudo-tone patterns in said output image data with N levels, N being an integer greater than one.

10. The method of claim 9, wherein said step (a) further comprises the steps of:

(i) multiplying said sum by a constant coefficient to obtain an offset; and (j) adding said offset to said predetermined threshold.

11. The method of claim 9, wherein each said weighting function has non-zero values over a predetermined range of levels, and is zero outside said predetermined range.

12. The method of claim 11, wherein said non-zero values follow a sine curve within said predetermined range.

13. The method of claim 12, wherein as the periods of said periodic functions decrease, the ranges of non-zero values of the weighting functions of said periodic functions shift toward higher levels.

14. The method of claim 13, wherein the ranges of non-zero values of said weighting functions mutually overlap.

15. An image-processing apparatus for processing input image data to generate output image data with pseudo-tone patterns, comprising:

a threshold processor modifying at least one predetermined threshold by combining said predetermined threshold simultaneously with at least two periodic functions having different periods, said periodic functions being functions of position in said input image data; and an error diffusion processor coupled to said threshold processor, comparing said input image data with the modified threshold, and using comparison results thus obtained to generate output image data with N levels, in which levels present in the input image data but not present among said N levels are simulated by pseudo-tone patterns in said output image data with N levels, N being an integer greater than one.

16. The image-processing apparatus of claim 15, wherein said input image data represent a plurality of horizontal scanning lines, and said periodic functions are one-dimensional, following said horizontal scanning lines.

17. The image-processing apparatus of claim 15, wherein said periodic functions are two-dimensional.

18. The image-processing apparatus of claim 15, wherein said error diffusion processor performs an error diffusion process.

19. The image-processing apparatus of claim 18, wherein said error diffusion processor divides said input image data into blocks, calculates a total quantization error in each of said blocks, and distributes weighted portions of said total quantization error to neighboring blocks.

20. The image-processing apparatus of claim 15, wherein N is equal to two.

21. The image-processing apparatus of claim 15, wherein N is greater than two.

22. The image-processing apparatus of claim 15, wherein said input image data are color image data comprising a plurality of color planes, and said threshold processor and said error diffusion processor operate on each of said color planes separately.

23. An image-processing apparatus for processing input image data to generate output image data with pseudo-tone patterns, comprising:

a threshold processor modifying at least one predetermined threshold according to at least two periodic functions having different period, said periodic functions being functions of position in said input image data;

an error diffusion processor coupled to said threshold processor, comparing said input image data with the modified threshold, and using comparison results thus obtained to generate output image data with N levels, in which levels present in the input image data but not present among said N levels are simulated by pseudo-tone patterns in said output image data with N levels, N being an integer greater than one;

wherein said threshold processor multiplies each of said periodic functions by a weighting function, using different weighting functions for different periodic functions, said weighting functions being functions of the levels in said input image data, and adds resulting products to obtain a sum.

24. The image-processing apparatus of claim 23, wherein said threshold processor multiplies said sum by a constant coefficient to obtain an offset, and adds said offset to said predetermined threshold.

25. Th e image-processing apparatus of claim 23, wherein each said weighting function has non-zero values over a predetermined range of levels, and is zero outside said predetermined range.

26. The image-processing apparatus of claim 25, wherein said non-zero values follow a sine curve within said predetermined range.

27. The image-processing apparatus of claim 26, wherein as the periods of said periodic functions decrease, the ranges of non-zero values of the weighting functions of said periodic functions shift toward higher levels.

28. The image-processing apparatus of claim 27, wherein the ranges of non-zero values of said weighting functions mutually overlap.

* * * * *